United States Patent [19]
Darby et al.

[11] Patent Number: 6,165,303
[45] Date of Patent: Dec. 26, 2000

[54] METHOD OF MAKING TUBULAR PRESSURE VESSEL HAVING AN END CLOSURE

[75] Inventors: C. Peter Darby, Fallbrook; Douglas Eisberg; Terry Gilbertson, both of Escondido, all of Calif.

[73] Assignee: Codeline Corporation, Chardon, Ohio

[21] Appl. No.: 09/142,984

[22] PCT Filed: Mar. 12, 1997

[86] PCT No.: PCT/US97/03888

§ 371 Date: Sep. 18, 1998

§ 102(e) Date: Sep. 18, 1998

[87] PCT Pub. No.: WO97/35125

PCT Pub. Date: Sep. 25, 1997

Related U.S. Application Data

[63] Continuation-in-part of application No. 08/619,357, Mar. 20, 1996, Pat. No. 5,720,411.

[51] Int. Cl.[7] .................................................. B65H 81/00
[52] U.S. Cl. ........................................... 156/175; 156/173
[58] Field of Search .............................. 156/172.171, 173, 156/178, 175, 189, 185, 187, 191, 192, 195; 210/232; 220/582, 580, 579, 578

[56] References Cited

U.S. PATENT DOCUMENTS

| | | | |
|---|---|---|---|
| 3,661,670 | 5/1972 | Pierpont, Jr. ............................ | 156/172 |
| 3,767,054 | 10/1973 | Farrow et al. .......................... | 210/232 |
| 4,358,377 | 11/1982 | Clark ...................................... | 210/323.2 |
| 4,781,830 | 11/1988 | Olsen ...................................... | 210/232 |
| 4,839,037 | 6/1989 | Bertelsen et al. ....................... | 210/97 |

FOREIGN PATENT DOCUMENTS

| | | | |
|---|---|---|---|
| 0 264 203 A2 | 4/1988 | European Pat. Off. ......... | F16J 13/02 |
| WO 88/03830 | 6/1988 | WIPO ............................. | D01D 13/01 |

*Primary Examiner*—Richard Crispino
*Assistant Examiner*—George R Koch, III
*Attorney, Agent, or Firm*—Fitch, Even, Tabin & Flannery

[57] ABSTRACT

Pressure vessels having end closures for sealing at least one open end are constructed so as to provide full-bore access to a generally tubular shell portion wherein one or more filter cartridges will be disposed. A sealing ring (45) of rectangular cross section is seated in a groove provided in the tubular shell (15) at a location axially inward of a cylindrical surface region wherein a central annular groove is provided. A closure head (39) fits within this annular surface and includes a shoulder (73) which prevents insertion past the scaling ring (45). The head may be a 2-piece construction wherein a flanged and dished element having an inward facing convex surface of oblate spheroidal shape protrudes through the interior of the sealing ring and mates with a securing plate (41) having an annular notch in the periphery of its outer face that aligns with the groove in the tubular shell to create a pocket designed to receive a helical locking ring (79) in the form of a spring-like band of at least two revolutions that cannot be inadvertently removed when the vessel is pressurized. A bell-end configuration for the tubular shell is efficiently created from filament-reinforced polymeric resin though the use of a sacrificial insert that not only creates the seat for the sealing ring but also provides space to accommodate side flow fluid connections.

5 Claims, 6 Drawing Sheets

METHOD OF MAKING TUBULAR PRESSURE VESSEL HAVING AN END CLOSURE

This is a Section 371 application of PCT/US97/03888 filed Mar. 12, 1997 which is a continuation-in-part of U.S. Ser. No. 08/619,357 filed Mar. 20, 1996, now U.S. Pat. No. 5,720,411 (Feb. 24, 1998).

This invention relates to pressure vessels having at least one open end and to end closures therefor. More specifically, it relates to cylindrical pressure vessels designed for pressure driven filtration operations, particularly to vessels which provide full-bore access to accept elongated, cylindrical filtration media cartridges. Even more particularly, it relates to improved end closure arrangements for such pressure vessels. It also relates to methods for making such pressure vessels of this general type and particularly to those designed for pressure driven filtration operations, especially filtration using filter cartridges, and more particularly to making vessels suited for sidewall porting to provide fluid flow couplings through the cylindrical sidewall of the pressure vessel.

BACKGROUND OF THE INVENTION

Cylindrical pressure vessels are used for a variety of industrial applications, and a family of relatively lightweight, strong, reinforced plastic composite pressure vessels has grown up as a result of advancements in synthetic fibers and polymeric resins, for example, using continuous strands of glass or carbon fibers or filaments to reinforce curable polymeric resin compositions, such as polyester resins, vinylester resins, polyurethane resins, epoxy resins and the like. Although there are many industrial uses for such pressure vessels, one major field of use is the field of filtration, both direct or dead end filtration and cross flow filtration; and for purposes of this application, filtration is used to broadly include separation treatments where semipermeable membranes are employed. "Filter cartridge" is used to broadly include filter bags, cartridge filters and semipermeable membrane cartridges or elements. "Cartridge filtration" is used to include such filtration operations using such filter cartridges.

Generally, "cross flow" filtration is contrasted with what is sometimes termed direct or "dead end" filtration. In cross flow filtration, only a portion of the feed liquid passes through the filter medium with the remainder of the feed liquid flowing across a membrane or other filter medium surface and exiting the other end of the filter cartridge; in such arrangement there are two exit ports from the pressure vessel, i.e. separate ports through which the cross flow concentrate and the filtrate or permeate exit. In direct or "dead end" filtration, the entire flow of the feed liquid passes through the filter media, and there is usually only a single exit stream.

Examples of cross flow filtration processes commonly employed in the last several decades include, but are not limited to, hyperfiltration (reverse osmosis), nanofiltration and ultrafiltration, all of which employ semipermeable membrane materials and are commonly referred to as membrane separation processes. In such operations, cylindrical cartridges have been conventionally employed which are received in a tubular surrounding pressure vessel having appropriate inlet and outlet ports. One or more end closures for such a pressure vessel are designed to have what is termed full-bore access; this allows a cylindrical cartridge or a bag having a defined exterior diameter just less than that of the interior bore of the pressure vessel to be slidably inserted through one open end thereof. In some instances, such cylindrical cartridges comprise a plurality of envelopes made of sheets of semipermeable membrane material which are spirally wound about a central porous core to provide a relatively large amount of membrane surface area within a given volume.

Many prior art pressure vessels used in cartridge filtration operations, especially cross flow filtration, have employed tubular housings made of glass fiber-reinforced polymeric resin composites provided with plug-type end closures, which are retained in sealing relationship at the end of the housing by a conventional O-ring seal and by appropriate retaining rings. Retaining rings which have been used include conventional spiral and snap rings, as well as segmental rings that comprise a plurality of separate pieces which are appropriately retained in assembled fashion by screws or like connectors. Generally in such reinforced-plastic composite pressure vessels, all the inlet and outlet ports have been provided in the pair of opposite end plugs, in order to avoid breaching the integrity of the cured composite body. The end plugs themselves are generally flat, plate-like bodies.

Safety considerations are frequently of prime importance in pressure filtration vessels, as many such filtrations require relatively high working pressures. Examples of filtration operations wherein it is important to be able to supply a feed at high pressure to the cartridges include those where semipermeable membrane permeation is being carried out, because such separation requires relatively high pressure difference across the membrane to achieve efficient operation.

Published Patent Application WO 88/03830 discloses closure assemblies for pressure vessels that can be used in cross flow or other pressure filtration equipment in order to provide full-bore access. Illustrated is an end plug having a cylindrical outer surface which can be slidably inserted within a smooth interior opening at the end of a pressure vessel. The end plug is provided with an axially inner female connector which receives a spigot at one end of a filtration element. When the end closure is installed, a pair of O-rings residing in an outer annular recess in the plug are physically compressed. The plug is secured in place by a locking element which seats in a groove within the pressure vessel interior cylindrical wall where it is secured in place by flanged keepers mounted by threaded bolts.

U.S. Pat. No. 4,781,830 shows a different type of end closure assembly for a cross flow filtration apparatus which also provides full-bore access. In the illustrated arrangement, an elongated cylindrical stainless steel housing is constructed which includes a generally bell-shaped adapter at each end that can include a side conduit connecting elbow. An end cap interfits with the adapter, via a bayonet-type fitting, to close the end opening, and a conventional O-ring is used to form a seal between the end cap and the seating surface on the adapter. This arrangement requires several specialized metallic subassemblies and is not considered to be particularly suitable for employment in a reinforced plastic composite pressure vessel arrangement.

Accordingly, improved versions of end closure assemblies for pressure vessels for pressure filtration, particularly fiber-reinforced polymeric resin vessels for cartridge filtration, have continued to be sought.

SUMMARY OF THE INVENTION

The present invention provides an improved pressure vessel that includes an end closure assembly which is particularly suited for use with fiber-reinforced polymeric resin pressure vessels or the like to provide full-bore access for pressure driven fluid filtration, e.g. bag and cartridge filtration, including cross flow membrane filtration, and it also provides improved methods for making same. Incorporated within the fiber-reinforced polymeric resin tubular shell, at a location just interior of its open end, is an annular element of generally C-shaped cross section which includes a central annular groove in its radially interior-surface that is otherwise cylindrical. The interior cylindrical surface of the annular element has a diameter about equal to, or slightly greater than, the diameter of the main bore of the elongated pressure vessel, and it thus provides full-bore access through which a cylindrical filtration cartridge can be slidably inserted or removed. The pressure vessel is formed with an annular cavity or counterbore region just axially inward of this annular element and contiguous therewith, and a shallow groove is provided in the wall of this cavity, immediately adjacent the annular element, wherein a flexible elastomeric sealing ring of rectangular cross section is seated. Because the seal is carried by the tubular shell, substantial latitude is allowed in the design of the plug or head for closing the open end of the shell. More particularly, it facilitates the use of a flanged and dished structural shape which is more structurally efficient than conventional plate-like heads, resulting in thinner, less expensive heads.

The open end of the pressure vessel is closed with a plug or head which has a surface proportioned to be relatively snugly received within the circular region defined by the annular element and which has a portion of lesser exterior diameter that protrudes into and/or through the circular interior of the rectangular cross section sealing ring and preferably slightly expands the elastomeric ring. A shoulder on the head abuts the axially outer face of the sealing ring and provides a stop beyond which the head cannot be further inserted. Interengagement between the head and the tubular shell is preferably achieved by a removable locking ring which is then fitted into the groove in the pressure vessel annular element; the locking ring extends sufficiently radially into the passageway to lock the head in place, thereby closing and sealing the open end of the pressure vessel. Even at high internal pressures, the head is thus prevented from moving outward past the locking ring.

A locking ring which is helical in shape and preferably comprises three turns or revolutions of a flat band of spring-like material is preferably used. An upstanding tang, which preferably extends in an axially outward direction, is provided at the outer end of the helical locking ring, and grasping of the tang allows the manual withdrawal of the locking ring by "walking" it outward by sequential movement around the 360° periphery of the passageway. By providing a circular shoulder that is spaced radially inward from the outer edge of the head, what might be referred to as an annular notch is formed in the periphery of the axially outward face of the head. With the head in its fully inserted position, this shoulder is in alignment with the groove in the pressure vessel annular element, and a pocket is thereby created having a depth such that at least one of the turns of the spring-like locking ring is totally trapped therein by the shoulder and thus cannot physically undergo sufficient inward radial movement to permit withdrawal of the locking ring from the annular groove while this turn is confined in the pocket. This arrangement provides an extra measure of safety which prevents a worker from inadvertently removing the locking ring when the pressure vessel still contains superatmospheric internal pressure, which could otherwise potentially result in the escape of the end closure at high velocity.

In addition, the invention provides a method of making such fiber-reinforced polymeric resin pressure vessels incorporating these improved end closures wherein an enlarged cavity or counterbore is conveniently provided just axially inward of the end closure, such cavity facilitating the incorporation of side flow couplings without detracting from the full-bore access desired for cartridge filtration pressure vessels or the like. In this respect, a sacrificial insert of suitable plastic material that will separate from the polymeric resin is located on a steel mandrel or other like form about which the tubular shell is to be wound and then cured, using resin-impregnated continuous strands or tows of glass fibers or other synthetic filamentary material, e.g. carbon fibers. This sacrificial insert is positioned in juxtaposition with an axially inward surface of the annular element, which may itself be positioned on a thin tubular spacer that is used to center the annular element, that has an internal diameter just slightly larger than that of the main bore of the tubular shell (which is of course determined by the diameter of the cylindrical mandrel that is used). After winding resin-impregnated strands of continuous fibers about the mandrel to create the overall assembly, curing is carried out so as to create a strong, rigid tubular shell, which is thereafter separated from the mandrel. After removal of the thin spacer which is also designed to separate from the cured resin, the sacrificial insert is removed. It can be originally split, as along a diagonal line, or otherwise constructed with frangible bridges, to facilitate its removal through the adjacent end opening. Such removal preferably provides both the desired shallow groove immediately adjacent the groove-carrying annular element and the large counterbore region which facilitates the installation of a side flow coupling so that all of the inlet and outlet ports need not be in the end closure heads.

BRIEF DESCRIPTION OF THE DRAWINGS

FIG. 4A is an enlarged fragmentary view of a portion of FIG. 4 designated by the broken-line circle.

DETAILED DESCRIPTION OF THE PREFERRED EMBODIMENTS

Figure 1:
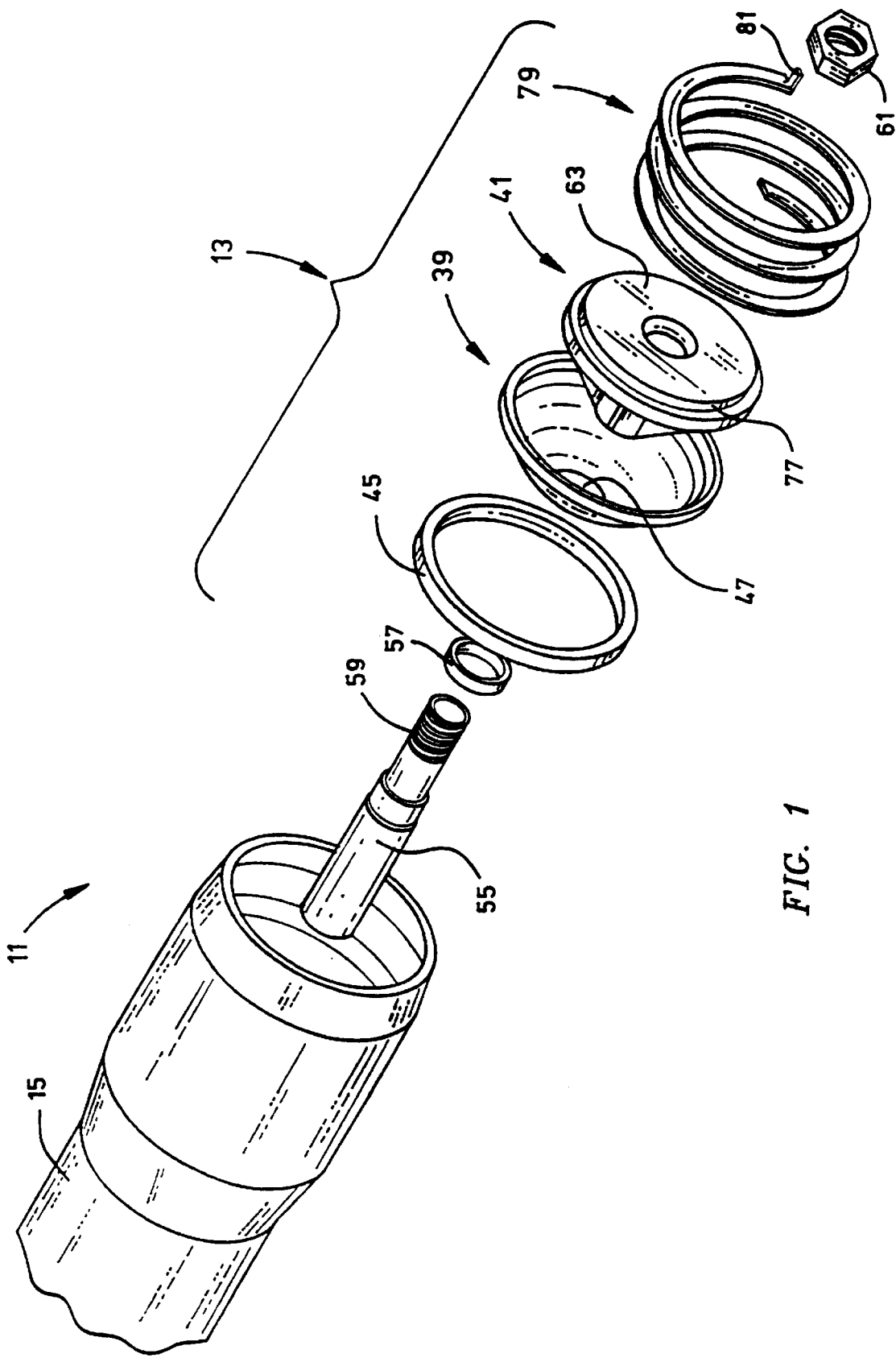
FIG. 1 is a fragmentary, exploded, perspective view showing a cartridge filtration pressure vessel including its end closure embodying various features of the invention.

Illustrated in FIGS. 1 through 4 is an improved pressure vessel 11 which includes separate, removable end closure assembly 13 that provides full-bore access so as to permit insertion thereinto of cylindrical filtration cartridges and the like. Thus, the pressure vessel is well suited for use with any cylindrical cartridges adapted for pressure driven filtration, for example, cross flow filtration cartridges made of arrangements of spirally wound sheets of semipermeable membrane. The pressure vessel 11 is also well suited for use in direct or dead end pressure filtration treatments, using filter bags, filter cartridges or other equivalent packages of filter media. The pressure vessel 11 includes an elongated tubular shell 15 which has at least one open end wherein the closure assembly 13 is located to seal the pressure vessel to the atmosphere and permit the maintenance of superatmospheric pressures, e.g. as high as one thousand psi or more, to be used to efficiently carry out separations or other filtrations. Because such full-bore access is provided, a right circular cylindrical filtration cartridge having a diameter just slightly less than the bore of the elongated tubular shell 15 can be readily slidably inserted thereinto or withdrawn therefrom through the open end shown in FIG. 1. The opposite end (not shown) of the tubular shell can be simply a duplicate of the end that is shown so that such a circular cross section cylindrical cartridge can be inserted through either end. Alternatively, the other end may have a different type of end closure, or it may simply be a blind end, i.e. being completely closed as by being formed with a flat end wall or integral dome or the like, as is well known in this art.

The tubular shell 15 can be made of any suitable material that has the strength and stability to withstand the desired superatmospheric pressure to which the pressure vessel is intended to be subjected. For example, the tubular shell could be made of a suitable metal alloy, such as stainless steel or some other corrosion-resistant alloy. It could also be made of engineered thermoplastics which might be molded or otherwise appropriately shaped, depending again upon the pressure for which it is being designed to withstand. Preferably, the tubular shell 15 is made of fiber-reinforced polymeric resin material; for example, resin-impregnated glass or other synthetic filamentary material, such as carbon fibers, can be employed. Such fibers are impregnated with a suitable curable polymeric resin, such as a polyester, a vinylester, a polyurethane, an epoxy or some comparable thermosetting resin. Most preferably, an epoxy resin is employed as is well known in this art, and the manufacture of the tubular shell 15 is carried out by appropriately winding about a mandrel 17 a multiplicity of strands of continuous glass fibers that are caused to pass through a bath of liquid epoxy resin material which contains a suitable hardener that promotes curing as a result of the passage of time and/or the application of heat, all as well known in this art.

Figure 3:
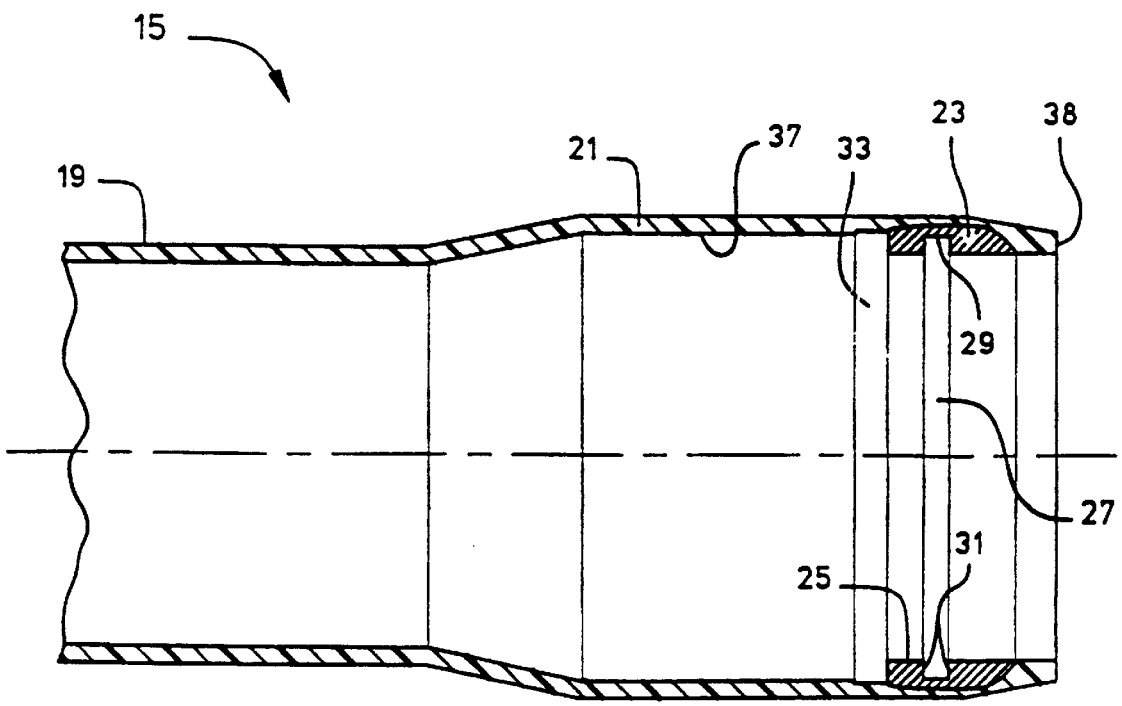
FIG. 3 is a sectional view similar to FIG. 2 after the tubular shell has been separated from the mandrel and the fabrication inserts have been removed.

FIG. 3 shows the tubular shell 15 in its final form; it has a main body section 19 of substantially constant interior and exterior diameter and therefore uniform wall thickness. At least one end of the tubular shell has a bell section 21 of greater diameter integrally connected to the main body 19; this bell section has fixedly imbedded therein an annular element 23 which interengages with the end closure assembly 13. The annular element 23 is preferably made of a metal alloy, e.g. carbon steel or stainless steel, or of a suitable composite material having adequate structural strength and rigidity. The annular element has a radially interior surface 25 which is a section of a circular cylinder that is coaxial with the circular cross section bore through the main body 19, which surface 25 is interrupted by a central groove 27. The groove 27 has a cylindrical base surface 29, which is also coaxial with the main passageway through the tubular shell, and has a pair of flanking sidewalls 31. Formed in the interior surface of the bell section 21, at a location immediately adjacent and axially inward of the annular element 23, is a shallow groove 33 which provides a seat for a sealing ring as described hereinafter.

Figure 2:
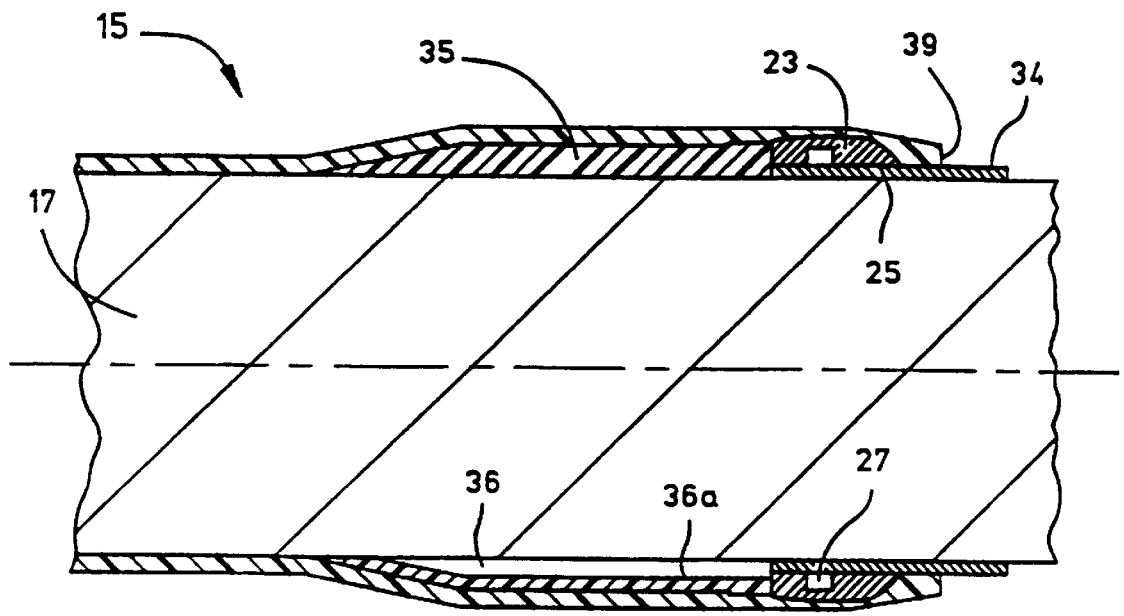
FIG. 2 is a sectional view taken through a fabricated tubular shell assembly for the pressure vessel of FIG. 1 as it was formed on a suitable mandrel.

Fabrication of the tubular shell portion of the pressure vessel is schematically shown in FIG. 2 when the preferred construction is employed of forming the tubular shell from strands of continuous fiber material impregnated with a curable polymeric resin. Depending upon the length of the pressure vessels, a plurality of tubular shells may be fabricated in end-to-end relationship on the same mandrel. Because the radially interior surface 25 of the annular element 23 has a slightly greater diameter than the bore through the main body 19, which is defined by the exterior surface of the mandrel 17, a thin spacer 34 is installed on the mandrel to coaxially position the annular element 23 at the location desired near the very end of what will become the tubular shell. An expendable, inexpensive, thermoplastic sleeve is preferably used which may be long enough to support an annular element 23 for the next tubular shell being formed on the same mandrel, or instead a flexible sheet of thermoplastic material can be wrapped around the mandrel interior of the annular element. To provide an interior cavity of a precise shape, a tubular sacrificial insert 35 is used which has an inner diameter equal to the exterior diameter of the mandrel 17 and an outer surface configuration which is the complement of the interior surface of a cavity 37 that it will form in the ultimate tubular shell 15. In the illustrated embodiment, the creation of the cavity forms the bell section 21.

The sacrificial insert 35 is preferably injection molded from a suitable thermoplastic material, for example polypropylene, having surface characteristics to which the polymeric resin does not adhere, and it is preferably constructed so that it can be relatively readily removed, following curing, to complete the fabrication of the tubular shell. To facilitate removal, for example, a single slot that extends diagonally in the radial direction can be provided that extends for the length of the insert, such a slot might terminate just short of the outer surface to leave a frangible bridge. Such a construction would allow the insert to be removed by inwardly squeezing it to have a smaller outer diameter. Alternatively, a plurality of radial slots or other spaced-apart indentations or notches could be provided that would leave frangible bridges at the surface which would permit the sacrificial insert to be relatively easily broken into a plurality, e.g. 4 or 5, sections that could be individually withdrawn through the adjacent open end. Illustrated in FIG. 2 is one such notch 36 near the bottom which is formed in the interior surface and which terminates short of the exterior surface to leave a frangible bridge 36a. The exterior surface of the sacrificial insert 35 is formed with an outwardly extending annular flange at its right-hand end, as depicted in FIG. 2, that would create the shallow groove 33 in the interior surface of the bell section immediately adjacent the annular element 23. If desired, the spacer 34 could be molded integrally as a part of the sacrificial insert 35; however, its simplicity of design is such that the illustrated use of a separate thin tubular spacer may be preferred.

With the spacer 34, the annular element 23 and the sacrificial insert 35 in place on the mandrel, winding about the mandrel assembly with resin-impregnated continuous fibers, such as epoxy resin-impregnated strands of continuous glass fibers, is carried out using state-of-the-art techniques to create a layup or assembly as generally depicted in FIG. 2. Upon completion of the winding to create a tubular body of desired wall thickness, curing is carried out, as for example heating to a temperature of about 100–150° C. for about 3 to 6 hours, to cure the epoxy resin to hardness as is well known in this art.

Instead of winding the resin-impregnated glass filaments directly onto the surface of the metal mandrel 17, a thin tubular liner (not shown) could be first fitted onto the mandrel, which liner would become an integral part of the eventual tubular shell as is well known in this art. Such liners are commonly made from thermoplastic materials, such as polyethylene, which preferably have a surface configuration to promote bonding to the polymeric resin to be used to impregnate the filamentary material.

Following curing and removal from the mandrel, the end face 38 is trimmed. Trimming provides a smooth end face 38 and may be carried out by slicing through tubular shell assembly and the sleeve 34 to simultaneously separate adjacent tubular shells. The sleeve 34 is then withdrawn, and the sacrificial insert 35 is removed using any suitable tools. For example, self-tapping screws may be inserted radially into the interior surface of the insert so that force can be applied that will fracture any frangible bridges, or alternatively a pair of such self-tapping screws might be inserted in a flanking relation to a diagonal slit that would allow these mating ends to be squeezed together, effectively sliding one surface on the other to decrease the outer diameter of the insert such as to permits its withdrawal through the adjacent open end of the tubular shell. The resultant fabricated tubular shell 15 has the appearance illustrated in FIG. 3 which provides a full-bore opening, i.e. the passageway through the open end is of equal or slightly greater diameter than the diameter of the elongated bore of the main body section 19 of the pressure vessel.

Figure 4:
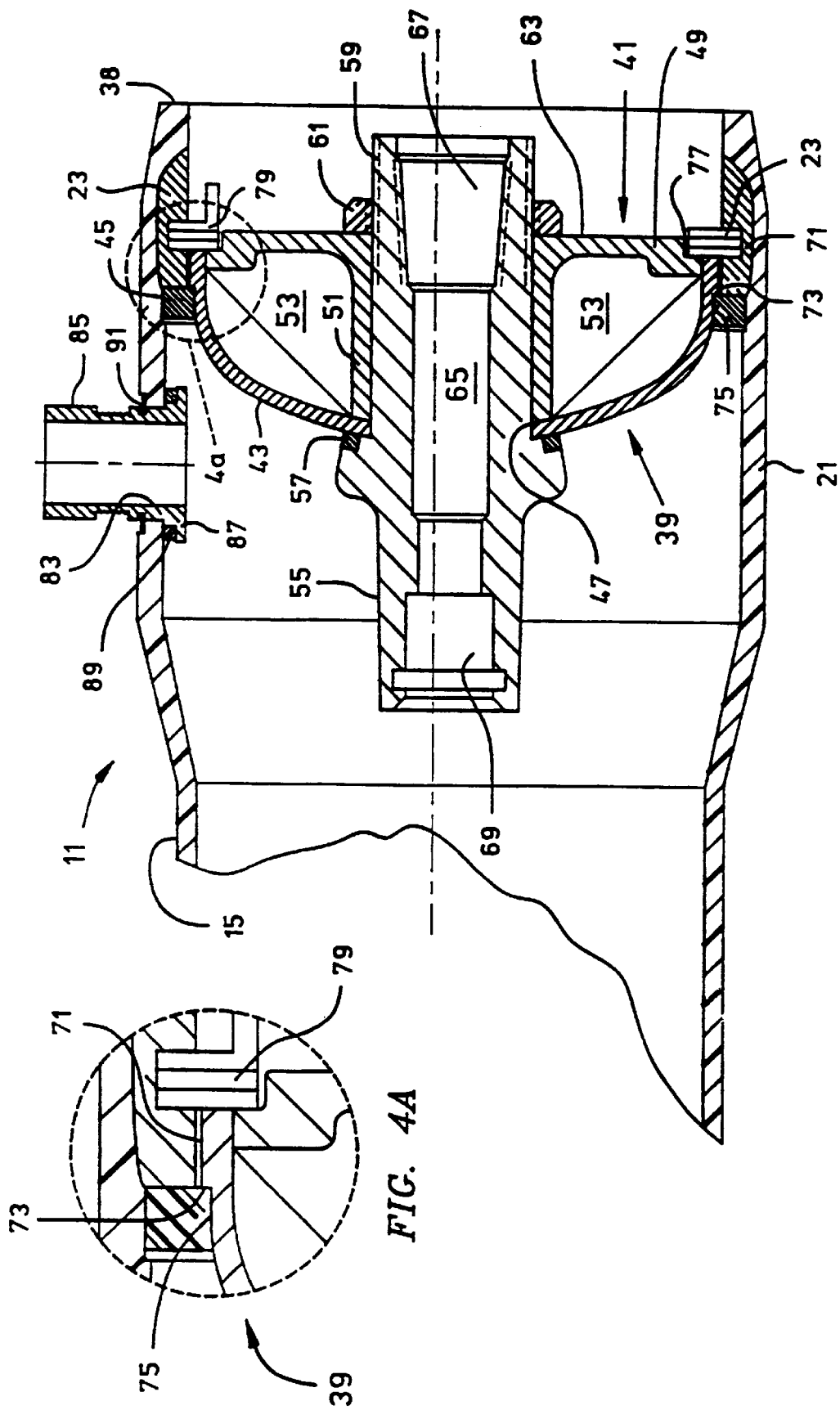
FIG. 4 is a sectional view through the tubular shell similar to FIG. 3 but with the end closure illustrated in FIG. 1 installed in sealing arrangement, and with an optional side flow coupling installed.

As seen in FIGS. 1 and 4, the end closure assembly includes a 2-piece head in the form of a dome-shaped metal element 39 and a mating securing or face plate 41. The dome-shaped element 39 has a convex outer surface 43 which protrudes through the interior of an elastomeric sealing ring 45 of annular shape and rectangular cross section, which is seated and retained in the shallow groove 33 in the annular element. The dome-shaped element 39 has a central opening 47 at its apex, which in its operative environment, is positioned concentric with the axial centerline of the bore of the tubular shell. The securing plate 41 includes a main plate member 49, a rearwardly or inwardly extending tubular boss 51 and a plurality of stiffening ribs 53, e.g. 4 which are arranged at 90° increments about the boss. The outer peripheral edge of the main plate member 49 fits snugly within the interior of the dome-shaped element 39, and the left-hand free end of the tubular boss 51, as shown in FIG. 4, seats against the inner concave surface of the dome-shaped element in surrounding relationship to the central opening 47.

A tubular connector 55 which carries an elastomeric seal 57 and which has an externally threaded outer end 59 extends through the central opening 47 and the tubular boss 51; it interconnects the securing plate 41 within the dome-shaped element 39 upon the installation of a threaded, hex-shaped nut 61, which has interior threads that mate with the exterior threads on the front or outward end 59 of the tubular connector 55. By tightening the threaded nut 61 so that it is pressed against an outer face 63 of the securing plate 41, the elastomeric seal 57 is compressed, and a fluid-tight seal is created between the tubular connector 55 and the dome-shaped element 39. The tubular connector 55 has a passageway 65 that extends axially therethrough and provides for liquid flow centrally through the end closure, either into or out of the interior of the pressure vessel. In this respect, the connector 55 may be formed with a front threaded receiver 67 that has standard pipe threads to facilitate a plumbing connection, and a rear receptacle 69 that is designed to carry an elastomeric seal and slidably receive a spigot that would protrude from one end of a filtration cartridge, all being aligned on the respective centerlines thereof.

The illustrated dome-shaped element 39 is of generally oblate spheroidal shape, preferably ellipsoidal; however, it could alternatively be hemispherical in shape, if desired. However, the oblate spheroidal shape shown is preferred, with the central opening 47 being disposed at the pole. The exterior convex surface 43 of the dome-shaped element terminates in a circular rim 71 at its periphery, which is at the right-hand or axially outward end in the illustrated operative arrangement. The rim 71 is provided by an annular flange that extends radially outward from the remainder of the outer surface and creates an inward-facing shoulder 73, as best seen in FIG. 4A. A cylindrical transitional strip 75 preferably separates the rim 71 from the major convex portion of the outer surface. Although the spheroidal surface might be continued to the shoulder 73, the cylindrical strip 75, which preferably has a width about equal to the width of the sealing ring 45, is preferred.

The relative proportioning of the components is such that, when the rectangular cross section elastomeric sealing ring 45 is installed in the shallow groove 33 in the tubular shell, its periphery is firmly seated in the groove, and although flexible, it has sufficient structural definition to resist axial displacement so that it is retained in its seated position in the shallow groove when the 2-piece head assembly is inserted. The elastomeric sealing ring 45 is a lathe-cut seal of generally square cross section made from a synthetic elastomer, such as ethylene propylene rubber or nitrile rubber, having a durometer of at least about 70, which is of course both expandable and compressible. Its outer diameter is such that its outer cylindrical surface can rotate within the shallow groove 33 without difficulty, and its inner diameter is slightly smaller than the outer diameter of the transitional cylindrical strip 75 on the outer surface of the element 39, e.g. by about 0.028–0.04 inch (0.071–0.102 cm). As a result of this proportioning, when the head is installed, the convex oblate spheroidal surface 43 serves as a lead-in surface which causes smooth expansion of the interior surface of the rectangular cross section sealing ring 45 as the relative axial movement occurs, and when the insertion is completed so that the sealing ring 45 is aligned with the cylindrical transitional strip 75, the seal has been compressed between the strip 75 and the base of the shallow groove 33. Preferably, there is compression in an amount between about 7% and about 20% of the cross sectional thickness thereof in a radial direction, thus establishing an excellent fluid-tight seal between the exterior of the dome-shaped element 39 and the interior surface of the tubular shell 15. In this position, the shoulder 73 may abut the side face of the sealing ring 45 which serves as a stop beyond which the head cannot be further inserted.

When the head has been fully inserted, the arrangement is such as generally depicted in FIG. 4, with a shoulder 77 that is provided in the outer face 63 of the securing plate 41, which creates an annular peripheral notch being aligned with the central groove 27 in the annular element 23 to create a pocket which is designed to receive a locking ring 79 that effect interengagement between the head and the tubular shell to retain the head in its sealing orientation. A variety of different locking rings, as known in this art, may be employed which will seat in the central groove 27 and extend radially inward in the region of the pocket so as to abut the outer face 63 of the head and thus prevent axially outward movement of the head, effectively locking it in the closed position. For example, a simple snap ring might be employed, or a segmented ring as presently used in pressure filtration vessels could be employed. However, preferably a helical locking ring 79, as best seen in FIG. 1, is employed which is in the form of a flat, rectangular cross section, band of spring-like material that includes at least about two complete turns or revolutions between its inner end and its outer end. The outer end has an upturned tang or post 81 located near its terminus which is the preferred construction to facilitate easy removal; however, it could be alternatively simply apertured or indented. The tang 81 is preferably fashioned by reducing the width of the end of the band and bending it 90°. Preferably, the locking ring 79 has three revolutions and terminates with a tang 81 which extends axially outward in a direction parallel to the centerline of the tubular element passageway. The locking ring can be made from a band of spring-like material, such as stainless steel, or some other suitable spring-like metal alloy or a fiber composite material or the like.

The locking ring 79 is designed to have an outer diameter equal to about that of the inner diameter of the base 29 of the groove, and its spring-like character permits its revolutions to be separated one from the other as depicted in FIG. 1. Accordingly, installation of the locking ring 79 is easily effected by inserting the inner end into the pocket formed between the base 29 of the groove 27 and the shoulder 77, and by then "walking" the ring around 360° for each revolution until the entire locking ring is seated in the groove, as depicted in FIG. 4, with the cylindrical tang 81 extending axially outward toward the open end. It can be seen that the locking ring 79 essentially fills the entire groove and in this position prevents the outward egress of the 2-piece head by providing an abutment which extends radially into the passageway and against which the outer surface face 63 of the head abuts when the interior of the pressure vessel is subjected to superatmospheric pressure. As can be seen from FIG. 4, the axial depth of the annular notch created by the shoulder 77, which forms the radially inner one-half of the pocket, is less than the axial width of the groove 23 by an amount that is about equal to the thickness of one turn of the band of spring-like material. Therefore, the shoulder 77 does not prevent the withdrawal of the outermost revolution of the locking ring 79, which is effected by grasping the tang 81 and moving it radially inward. Moreover, such withdrawal can be facilitated by the use of a tool having a body of right circular cylindrical shape depending from a handle, with the working end surface of the tool having an eccentrically located hole which would receive the tang; upon rotating such a tool 180°, the camming action of the tool against the interior surface of the annular element 23 would smoothly extract the outer end of the locking ring from the pocket, so that the ring could then be manually walked outward by reversing the installation procedure, i.e. by manually tracing three 360° revolutions about the opening.

It should be apparent, however, that such extraction is possible only when the closure assembly is in an "unloaded" position (or as shown in FIG. 4) where the pocket design permits such radially inward deflection of the helical band past the shoulder 77. If for example, a worker were to inadvertently attempt to remove the locking ring 79, falsely assuming that the pressure vessel was not pressurized when in fact there was. superatmospheric pressure within the vessel, he would be prevented from doing so. There would be an outward axial force on the head that would be tending to move the outer face 63 of the securing plate 41 to the right, and such movement would occur as far as permitted by the locking ring. As a result of such axial outward movement of the head, the shoulder 77 would be shifting to the right in FIG. 4 and in effect causing the radially interior one-half of the pocket to decrease in axial depth as the revolutions of the locking ring were removed, and once the outermost revolution of the ring was withdrawn, the shoulder 77 would entrap the remaining two revolutions in the pocket and thus positively prevent further withdrawal of the locking ring. Consequently, a worker would be positively prevented from inadvertently removing the ring from a pressurized vessel that could otherwise potentially result in the expulsion or ejection of the head as a projectile from the open end of the tubular shell.

Overall, it can be seen that there are several significant advantages that result from this novel end closure arrangement.

The creation of the retaining seat in the interior surface of the tubular shell 15 permits the rectangular cross section sealing ring 45 to be carried by the tubular shell, whereas heretofore, in such full-bore access pressure vessels, this critical seal has generally been carried by the removable head. The present alternative arrangement has a significant advantage in that it allows considerable latitude in head design and permits the employment of more economical head designs in such end closure assemblies. In the illustrated embodiment, it permits the employment of a 2-piece head in the form of a flanged and dished element 39 made, for example, of $\frac{1}{16}$-inch (0.16 cm) thick stainless steel in combination with an injection-molded, ribbed securing plate 41 made of ABS or similar thermoplastic material, instead of using a more conventional, $\frac{9}{32}$-inch (0.71 cm) thick, metal alloy plate-like head for a 4-inch (10.2 cm) pressure vessel that is designed for operation at internal pressures up to about 300 psi (21.1 kg/cm$^2$). Although stainless steel may be preferred, other materials can be used for the element 39. For example, carbon steel coated with a moisture barrier or lined with a diaphragm made of thermoplastic film, e.g. PVDF or polyethylene, may be used, or the element 39 may be formed from a sheet of fiber-reinforced composite material.

In addition to providing full-bore access to the pressure vessel and a seat for the sealing ring 45, the cavity 37 in the bell section 21 provides space to permit the ready installation of side couplings for a fiber-reinforced polymeric resin tubular shell 15 without detracting from the desired full-bore access. In the illustrated embodiment, a transverse opening 83 is drilled or otherwise suitable formed in the sidewall of the bell section 21. If desired, the opening 83 can be simply tapped, as the fiber-reinforced epoxy resin will adequately support a pipe thread to permit a piping connection to be simply threaded into the tapped hole. Because of the substantial radial depth of the cavity 37, the threaded end of such a piping connection can intrude into the tubular shell in this region a sufficient distance to assure a firm bite between the mating threads without interfering with the axially inward or outward movement of a filtration cartridge or the like. Preferably, however, a standard separate coupling 85 is used which is inserted through the transverse opening 83 from the interior, by reaching inward from the open end of the tubular shell, so that it protrudes outward through the sidewall. The coupling 85 would have an end flange 87 that carries an elastomeric seal 89 and which would be held in place with the seal compressed against the interior sidewall by the installation of a snap ring 91 of conventional design in a groove provided for this purpose in the exterior of the coupling. The cavity 37 provides ample clearance for the flange 87 and elastomeric seal 89 and thus provides an excellent solution to the long-standing problem of economically providing side flow fluid passageways into a fiber-reinforced polymeric resin pressure vessel, which has heretofore not been truly commercially feasible. Moreover, this design can accommodate 2 or more couplings 85 at one bell section, e.g. at 90° or 180° spacing, which can greatly facilitate the interconnection of such pressure vessels in a parallel array.

Figure 5:
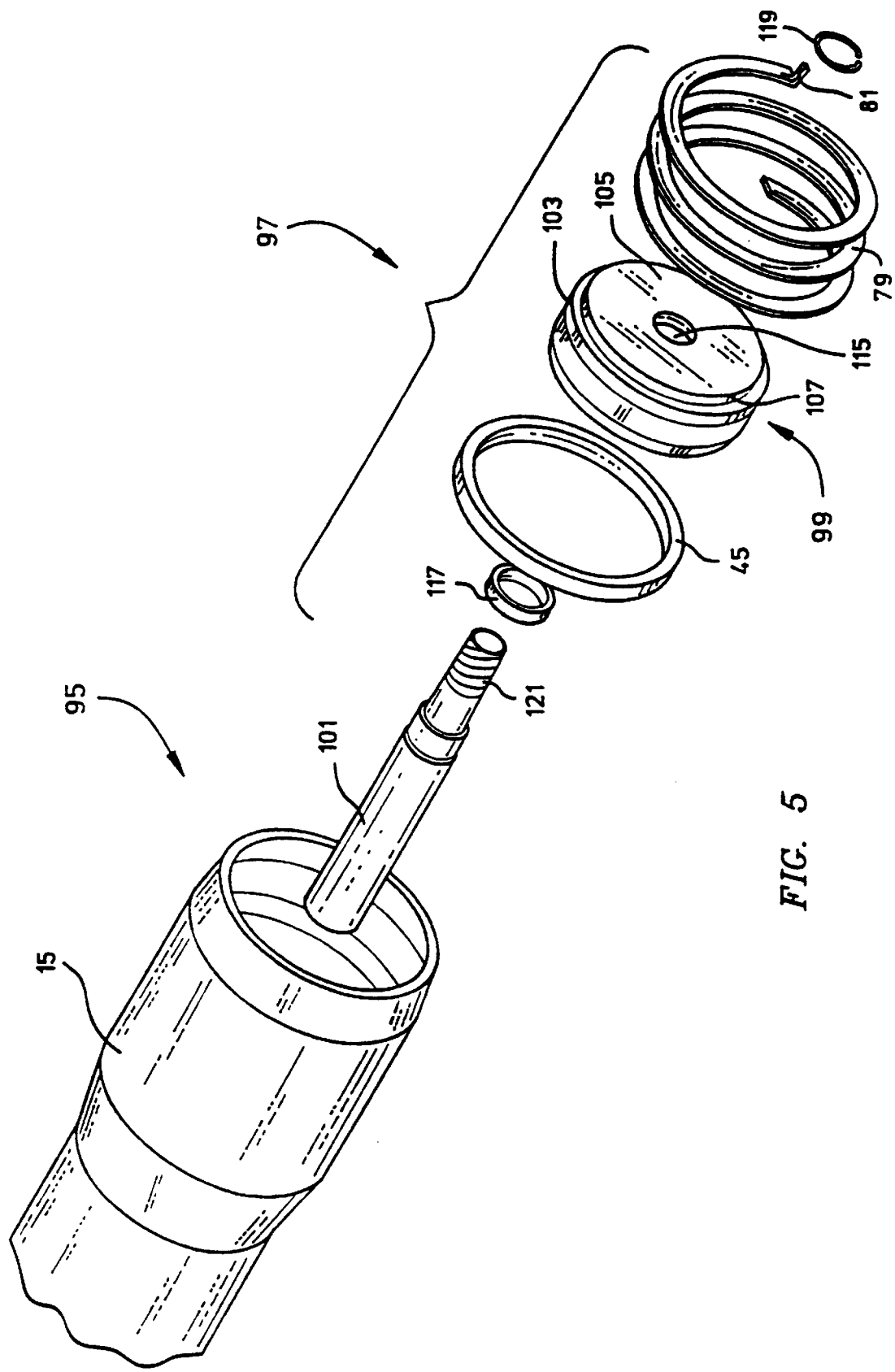
FIG. 5 is a view similar to FIG. 1 showing a pressure vessel similar to that shown in FIG. 3 which includes an alternative embodiment of an end closure.
Figure 6:
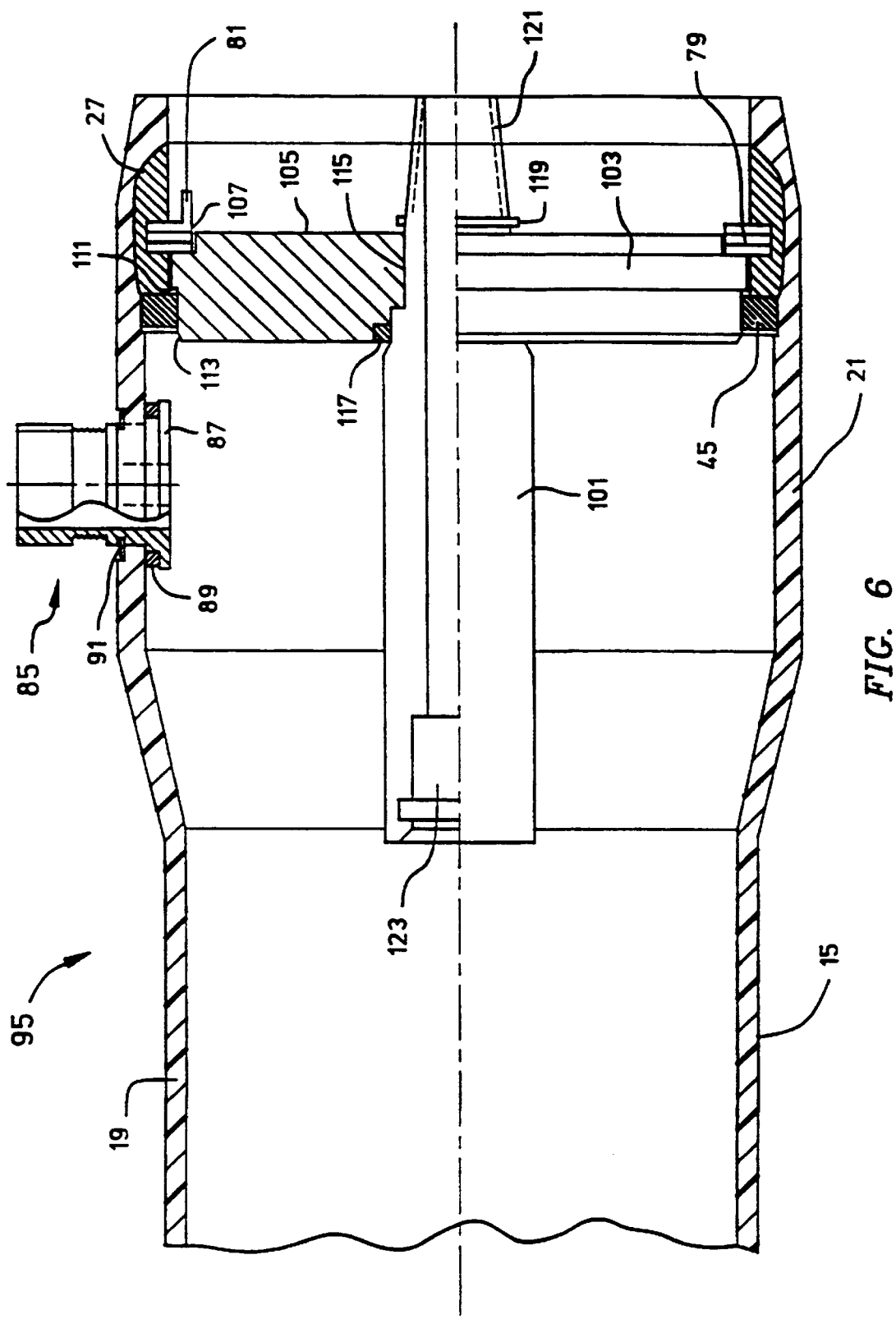
FIG. 6 is a sectional view through the tubular shell shown in FIG. 5 with its end closure installed, with portions of the end closure arrangement shown in section and others in elevation, and with an optional side flow coupling installed.

Illustrated in FIGS. 5 and 6 is an alternative embodiment of a pressure vessel 95 which includes a tubular shell 15 exactly the same as that hereinbefore described, with a modified end closure assembly 97. Generally, the end closure assembly 97 utilizes the same rectangular cross section sealing ring 45 and the same helical locking ring 79 but employs a plate-like plug 99 and a tubular connector 101 of slightly different shape and design.

More specifically as best seen perhaps in FIG. 6, the plug 99 is in the form of a relatively thick plate of circular shape, which can be a fiber-reinforced composite material, e.g. glass fiber-reinforced epoxy resin, aluminum lined with PVDF, polyethylene or the like, plain steel coated or lined as mentioned hereinbefore, or possibly even stainless steel or some other suitable corrosion-resistant metal alloy. The plate-like plug 99 is shaped to have a central flange 103 of largest diameter which is slightly less than the diameter of the radially interior surface 25 of the annular element 23. The plug 99 has an outer face 105 which is provided with a shoulder 107 that provides a peripheral annular notch which mimics the function of the shoulder 77 hereinbefore described and similarly forms a pocket with the central groove 27 to retain therewithin the helical locking ring 79. The left-hand or axially inner surface of the plug, as viewed in FIG. 6, is stepped so as to have a surface of slightly lesser diameter and provide a shoulder 111 which faces axially inward. The stepped, inward surface of the plug 99 terminates in a chamfer 113.

The plug 99 has a central passageway 115 which may be counterbored, as illustrated, and is designed to receive the outer end of the tubular connector 101 which protrudes therethrough. A fluid-tight seal between the plug 99 and the tubular connector 101 is provided by an elastomeric seal 117 which is seated in such counterbore, and the tubular connector is locked to the plug 99 by a standard snap ring 119 which is received in a groove that is appropriately provided in the outer surface of the connector just to the left of its outer end section, which is provided with a male pipe thread 121. The inner end of the tubular connector 101 is formed with a receptacle 123 similar to the receptacle 69 hereinbefore described, in which an elastomeric seal or O-ring will be seated and which will receive and seal with the spigot from the end of a filtration cartridge or the like that is operatively positioned within the bore of the tubular shell 15.

Once such a filtration cartridge (not shown) is in place, the plug and tubular connector assembly 99, 101 is inserted axially into the end of the tubular shell 15 in which the rectangular cross section sealing ring 45 has been previously seated. The chamfered surface 113 enters the interior of the sealing ring causing it to spread and expand in a manner similar to the effect achieved by the convex ellipsoidal surface 43 of the 2-piece head described hereinbefore. The sealing ring 45 is similarly radially compressed to create an excellent fluid-tight seal between the exterior surface of the plug 99 and the interior surface of the tubular shell. The upstanding, rearward facing shoulder 111 on the radially exterior surface of the plug prevents further axially inward movement of the plug and halts such movement with the shoulder 107 that forms the annular notch generally aligned with the groove 27 to create the desired pocket described hereinbefore. As a part of such axial insertion of the plug/tubular connector assembly, a spigot at the end of a filtration cartridge located in operative position within the pressure vessel bore enters the left-hand end of the tubular connector 101 and becomes sealingly received in the receptacle 123.

With the plug 99 in this position, the locking ring 79 is installed in the same manner as hereinbefore described, by first inserting the inner end into the pocket formed in part by the groove 27 and then manually pressing inward on the spring-like band, tracing three 360° revolutions, during which the radially exterior surface of the locking ring 79 slides against the interior cylindrical surface 25 of the annular element 23 until the outer end of the locking ring finally snaps into place, leaving the ring completely installed as depicted in FIG. 6. In this orientation, the locking ring provides the radially extending barrier against which the outer face 105 in the region of the notch 107 abuts under internal pressure, preventing axially outward egress of the plug and thus locking the end closure in place. The dimensioning of the pocket, as described hereinbefore, similarly prevents inadvertent removal of the locking ring's innermost two revolutions so long as the interior of the pressure vessel contains superatmospheric pressure. A side flow fluid passageway-providing coupling 85 can likewise be installed in a transverse passageway through the bell section 21 sidewall of the tubular shell of a fiber-reinforced polymeric resin-type pressure vessel.

Figure 7:
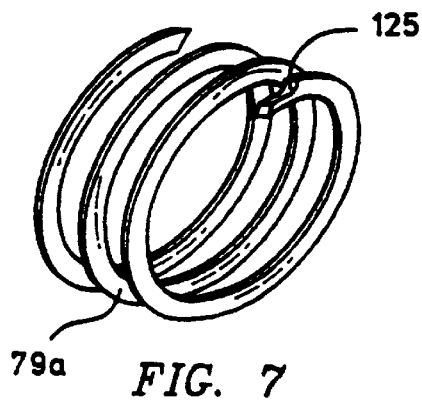
FIG. 7 is a perspective view showing an alternative embodiment of a helical locking ring or band which may be employed in the pressure vessel of FIGS. 1–4A or FIGS. 5 and 6.
Figure 8:
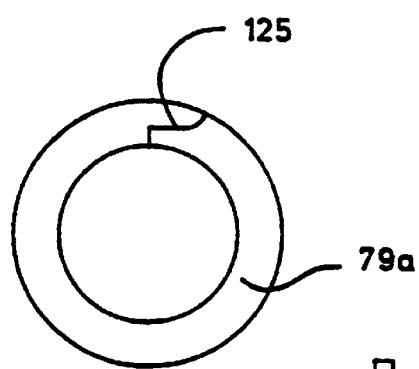
FIG. 8 is a front view of the helical locking ring of FIG. 7.
Figure 12:
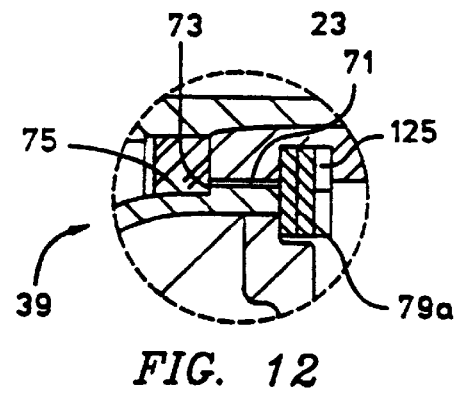
FIG. 12 is an enlarged fragmentary view similar to FIG. 4A showing the same portion of the pressure vessel with the end closure installed wherein the alternative helical locking ring of FIG. 7 is in place.

Illustrated in FIG. 7 is an alternative embodiment of a helical locking ring or band 79a which is essentially the same as the locking ring shown in FIGS. 1 and 5 except that, instead of having an axially-projecting tang 81, the outer end of the locking ring 79a is formed with a radiused notch 125, as best seen in FIG. 8. The locking ring 79a is otherwise made of the same spring-like material, such as stainless steel, and is dimensioned the same. It is installed in the same manner as the locking ring 79, and once installed as depicted in FIG. 12, the radiused notch 125 provides a recess interior of the outer end of the locking ring.

Figure 9:
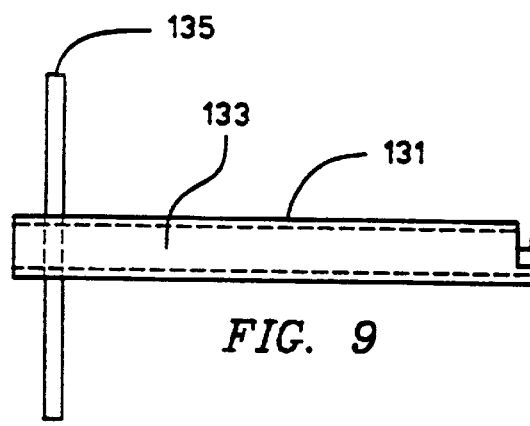
FIG. 9 is a front view of a hand tool for use in removing the helical locking ring of FIG. 7 from a pressure vessel with an end closure in place.
Figure 10:
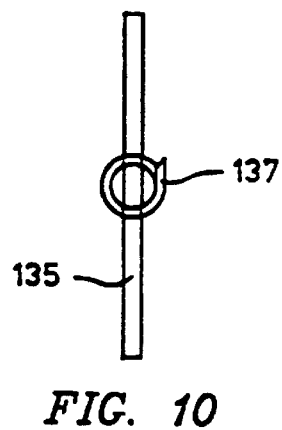
FIG. 10 is a right-hand elevation view of the tool shown in FIG. 9.
Figure 11:
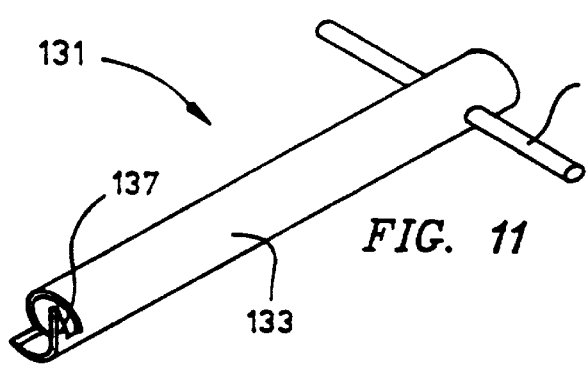
FIG. 11 is a perspective view of the tool shown in FIGS. 9 and 10.
Figure 13:
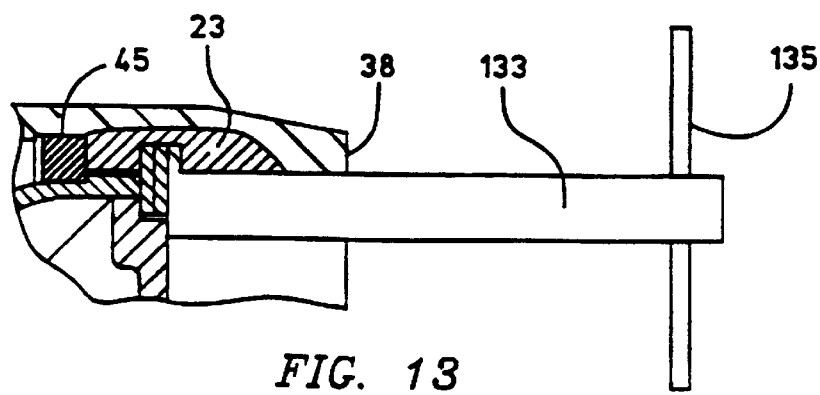
FIG. 13 is a view, generally in section but with the tool shown in elevation, of a fragmentary portion of the pressure vessel and end closure arrangement shown in FIG. 12 with the tool inserted in removal position prior to its rotation for beginning removal of the installed locking ring of FIG. 7.

To facilitate removal of the ring in order to remove the end closure, a simple tool 131 shown in FIGS. 9–11 is provided. The tool includes a tubular barrel 133 which has a drilled hole that passes through its upper end and has its bottom end machined. The hole at the upper end receives a rod 135 that serves as a handle for the tool. Its lower end is cut and then bent to provide a pointed finger 137 which is aligned generally tangential to, and separated by a slot from, the remainder of the tubular barrel. The locking ring 79a can be easily removed by inserting the tool, see FIG. 13, so its bottom end rests on the surface of the central turn of the helix, with the pointed finger 137 lying generally against the outer tip of the locking ring. Clockwise rotation of the handle 135 causes the end of the ring, narrowed by the radiused notch, to snap into the slot adjacent the finger 137 with an audible sound. With the finger in position and the locking ring end in the slot, pulling the tool generally radially inward brings the outer end of the ring along with it. Once this end is clear, the remainder of the ring is manually walked outward from the pocket as in the case of the locking ring 79.

In summary, it can be seen that the end closure assembly designs are suitable for use with pressure vessels of various shapes that can be made of a variety of different structural materials. However, they are particularly advantageous to provide full-bore access to pressure vessels adapted for use in pressure filtration, and particularly for cartridge filtration wherein one or more cylindrical cartridges will be installed through an open end into the bore of a tubular shell. The seating of an elastomeric sealing ring, preferably one of rectangular or generally square cross section, in the interior surface of the tubular shell allows considerable latitude in head design and facilitates the efficient and economical employment of flanged and dished dome-like heads. Such heads having no re-entrant structures can be relatively inexpensively formed from metal or composite material, and can be easily coated or lined with a thermoplastic film to enhance chemical resistance, as desired. Moreover, such a smooth convex, ellipsoidal surface facilitates straightforward installation of the end closure by assuring a gradual expansion of the annular sealing ring 45, both promoting ease of final insertion and assurance of a tight seal between the head and the interior surface of the tubular shell.

Moreover, the overall design which utilizes a helical locking ring in the form of a flat band of at least two revolutions permits the establishment of a fail-safe pocket which positively prevents inadvertent removal of such a locking ring while the pressure vessel remains pressurized at high internal pressures. Furthermore, the design is particularly suited for incorporation into fiber-reinforced polymeric resin pressure vessels wherein a suitable cavity of precise shape and dimension can be efficiently formed within a bell-end upon a mandrel through the use of a sacrificial insert. This fabrication method not only provides a way of efficiently creating a precise seat in the interior surface of the tubular shell for retaining the rectangular cross section sealing ring (which as previously indicated provides advantageous freedom in head design), but it also provides annular space just interior of the end closure which can accommodate side conduit connections that were heretofore difficult to achieve in fiber-reinforced polymeric resin pressure vessels. Such side flow connections are particularly advantageous for use in cross flow filtration apparatus, e.g. reverse osmosis separation processes, although they are also advantageously employed in other pressure filtration systems.

Although the invention has been described with regard to certain preferred embodiments which constitute the best mode presently contemplated by the inventors for carrying out this invention, it should be understood that various changes and modifications as would be obvious to one having the ordinary skill in this art may be made without deviating from the scope of the invention which is defined by the claims appended hereto. For example, as previously mentioned, if a fiber-reinforced polymeric resin tubular shell is employed, it can be provided with a thin inner thermoplastic liner, as is known in the art, which extends for essentially the full length thereof, and if desired, that liner can be employed to create the counterbore region and the shallow groove 33 in which the rectangular cross section seal is seated, forming the shallow groove in the surface of the liner itself or immediately adjacent the end thereof, as desired. One further alternative for providing the shallow groove 33 is to widen and thicken the annular element 23 and create such a groove in the wall of a counterbore region at one end. Of course, if the pressure vessel is made from metal or a suitable composite, the grooves 27 and 33 can be machined in the interior surface; however, such a construction would not have the fabrication economics that flow from using an annular insert of defined shape. On the other hand, it should be feasible to roll-form the annular insert into metal tubing that would provide the pressure vessel body.

Although the illustrated heads are shown with central passageways therethrough for the provision of a fluid inlet or outlet on the centerline of the end closure, an additional fluid passageway could be provided off-center in the plug 99 for example. Alternatively, either of the heads could be made imperforate, having no fluid passageway; as such they would be useful for closing one end of a pressure vessel wherein, if desired, a passageway or passageways could be optionally provided near that end by side couplings, such as those described which are seated in transverse openings through the sidewall of the bell end sections. If a plug-type closure head is used, it could alternatively carry the sealing ring 45 although such is not preferred.

Moreover, several other alternatives of head construction may also be incorporated into the overall invention. The dome-shaped element 39 could be designed to function with a slightly axially longer sealing region and with the convex spheroidal surface facing axially outward. In such a modification, instead of a ribbed securing plate 41, an annular bearing ring that would fit against the convex surface could be used to provide the shoulder which defines the radially inner one-half of the pocket for the locking ring 79, and such an alternative version of a dome-shaped element would locate the cylindrical surface on which the sealing ring would be expanded on the opposite side of the rim. Other interengaging means may also alternatively be used; for example, the groove 27 could be used to receive an axial flange or skirt portion at the end of a domed head designed for one-time usage. Such a groove could be provided by a separate annular element or directly in the wall of the shell itself when low pressure operation is contemplated. This skirt would be rolled or otherwise deformed, as by cold-forming, to seat within the groove (which could be suitably modified in shape to facilitate same) although such construction would likely entail destroying the domed head to remove it at the end of the lifetime of the filtration cartridge or the like.

Particular features of the invention are set forth in the claims that follow.

What is claimed is:

1. A method of making a generally tubular pressure vessel having a tubular shell that has at least one open end which is designed to interengage with closure head means in a manner so as to provide full-bore access therethrough, which method comprises providing generally cylindrical mandrel means proportioned to have an exterior surface which approximates an interior surface of said tubular shell, positioning on said mandrel means (a) an annular element which is formed with a first annular groove in a radially interior surface thereof and (b) an annular sacrificial insert of specific shape, said insert being located axially inward of and adjacent said annular element with respect to the ultimate interior of said pressure vessel, overwrapping said mandrel means, said annular element and said annular insert with strands of continuous fiber material and impregnating said fiber material with a curable polymeric resin to create an overwrapped assembly on said mandrel means, curing said overwrapped assembly to create a strong rigid tubular shell having at least one open end, separating said overwrapped assembly from said mandrel means, and removing said sacrificial insert from the interior wall of said tubular shell to provide an annular cavity of defined shape in the otherwise generally cylindrical interior surface of the tubular shell immediately axially interior of said annular element, said annular cavity being contiguous with the axially interior surface of said annular element and providing space within said tubular pressure vessel to accommodate a sealing ring.

2. The method in accordance with claim 1 wherein said sacrificial insert has a continuous outer face with at least one frangible region and wherein said frangible region is fractured to effect said removing of said insert.

3. A method in accordance with claim 1 wherein said sacrificial insert has sufficient axial length and radial depth to provide sufficient space to install a side conduit connection axially interior of the closure head means without interfering with the full-bore access therethrough.

4. A method of making a generally tubular pressure vessel having a tubular shell that has at least one open end which is designed to interengage with closure head means in a manner so as to provide full-bore access therethrough, which method comprises providing generally cylindrical mandrel means proportioned to have an exterior surface which approximates an interior surface of said tubular shell, positioning on said mandrel means (a) an annular element which is formed with a first annular groove in a radially interior surface thereof and (b) an annular sacrificial insert of specific shape, said insert being located axially inward of and adjacent said annular element with respect to the ultimate interior of said pressure vessel, overwrapping said mandrel means, said annular element and said annular insert with strands of continuous fiber material and impregnating said fiber material with a curable polymeric resin to create an overwrapped assembly on said mandrel means, curing said overwrapped assembly to create a strong rigid tubular shell having at least one open end, separating said overwrapped assembly from said mandrel means, removing said sacrificial insert from the interior wall of said tubular shell to provide a cavity of defined shape immediately axially interior of said annular element, and seating elastomeric seal means of annular shape and rectangular cross section in a seat formed in said cavity by said sacrificial insert at a location adjacent said annular element, said seal means having an outer diameter such that it is retained in said seat in said cavity and having an inner diameter such that it extends radially inward past said annular element to seal with the closure head means.

5. A method of making a generally tubular pressure vessel having a tubular shell that has at least one open end which is designed to interengage with closure head means in a manner so as to provide full-bore access therethrough, which method comprises providing generally cylindrical mandrel means proportioned to have an exterior surface which approximates an interior surface of said tubular shell, positioning on said mandrel means (a) an annular element which is formed with a first annular groove in a radially interior surface thereof and (b) an annular sacrificial insert of specific shape, said insert being located axially inward of and adjacent said annular element with respect to the ultimate interior of said pressure vessel and having a specific shape such as to create a counterbore region axially inward of said seat, overwrapping said mandrel means, said annular element and said annular insert with strands of continuous fiber material and impregnating said fiber material with a curable polymeric resin to create an overwrapped assembly on said mandrel means, curing said overwrapped assembly to create a strong rigid tubular shell having at least one open end, separating said overwrapped assembly from said mandrel means, removing said sacrificial insert from the interior wall of said tubular shell to provide a cavity of defined shape immediately axially interior of said annular element, creating port means which extends transversely through said tubular shell sidewall in said counterbore region of said cavity, and installing coupling means in said port means, to provide a side connection for liquid flow communication with the interior of said pressure vessel axially inward of said seal means by inserting said coupling means through said port means from the interior of said tubular shell so that a portion protrudes radially outward therethrough and a portion is disposed interior of said shell, said counterbore region of said cavity being of such radial depth that the portion of said coupling means which remains interior of said tubular shell does not interfere with full-bore access to the interior of said pressure vessel.

* * * * *